United States Patent [19]

Briley

[11] 3,766,527

[45] Oct. 16, 1973

[54] PROGRAM CONTROL APPARATUS

[75] Inventor: Joseph C. Briley, Milford, N.H.

[73] Assignee: Sanders Associates, Inc., Nashua, N.H.

[22] Filed: Oct. 1, 1971

[21] Appl. No.: 185,649

[52] U.S. Cl. .............................................. 340/172.5
[51] Int. Cl. .............................................. G06f 9/18
[58] Field of Search .................. 340/172.5; 235/157

[56] References Cited

UNITED STATES PATENTS

| | | | |
|---|---|---|---|
| 3,651,475 | 3/1972 | Dunbar et al. | 340/172.5 |
| 3,551,895 | 12/1970 | Driscoll | 340/172.5 |
| 3,533,075 | 10/1970 | Johnson et al. | 340/172.5 |
| 3,401,376 | 9/1968 | Barnes et al. | 340/172.5 |
| 3,202,969 | 8/1965 | Dunwell et al. | 340/172.5 |
| 3,609,700 | 9/1971 | Wollum et al. | 340/172.5 |
| 3,387,278 | 6/1968 | Pasternak | 340/172.5 |
| 3,573,852 | 4/1971 | Watson et al. | 340/172.5 |
| 3,544,974 | 12/1970 | Tan | 340/172.5 |
| 3,717,850 | 2/1973 | Ghiron et al. | 340/172.5 |
| 3,573,854 | 4/1971 | Watson et al. | 340/172.5 |
| 3,254,329 | 3/1966 | Lukoff et al. | 340/172.5 |
| 3,242,464 | 3/1966 | Rakoczi | 340/172.5 |
| 3,168,724 | 2/1965 | Anderson | 340/172.5 |
| 3,058,658 | 10/1962 | Schmierer | 340/172.5 |
| 3,027,081 | 3/1962 | Evans | 340/172.5 |

*Primary Examiner*—Paul J. Henon
*Assistant Examiner*—Mark Edward Nusbaum
*Attorney*—Louis Etlinger

[57] ABSTRACT

Program control apparatus in which current instruction execution and next instruction fetch occur in overlapped time periods during one instruction cycle. The results of a previous instruction execution are employed to set or not set selected ones of a plurality of condition latches in accordance with a current instruction. The current instruction also includes a test code which when combined in a decoding network with the outputs of the latches will produce a selection signal to a next instruction address multiplexer. The multiplexer will respond thereto to selectively couple one of plural instruction address sources to an instruction address buss. The program control apparatus also includes means responsive to a current instruction test code and the outputs of the condition latches to enable or to inhibit the storage of the results of an instruction execution.

4 Claims, 8 Drawing Figures

INVENTOR
JOSEPH C. BRILEY
BY Robert R. Hubbard
ATTORNEY

INVENTOR
JOSEPH C. BRILEY
BY Robert R. Hubbard
ATTORNEY

INVENTOR
JOSEPH C. BRILEY
BY Robert R. Hubbard
ATTORNEY

INVENTOR
JOSEPH C. BRILEY
BY Robert R. Hubbard
ATTORNEY

PATENTED OCT 16 1973 3,766,527

INVENTOR
JOSEPH C. BRILEY
BY Robert R. Hubbard
ATTORNEY

INVENTOR
JOSEPH C. BRILEY
BY Robert R. Hubbard
ATTORNEY

PROGRAM CONTROL APPARATUS

BACKGROUND OF THE INVENTION

1. Field of Invention

This invention relates to data processing apparatus and, in particular, to new and improved techniques for fetching and executing instructions in digital computers of the stored program type.

In stored program computers, instructions or command words are used both to fetch or address data words (operands), and to control various operations performed on such data words. A typical instruction word includes a plurality of bits, some of which are known as the operation code field (OP CODE) and others of which are known as the address field. The OP CODE identifies a particular operation which the computer is to perform, and the address field identifies the location(s) in either the computer memory or in computer registers of the data word(s) upon which the specified operation is to be performed. The performance of a particular job by the computer generally requires a number of such instructions which are arranged in an orderly sequency called a program. That is, the program consists of an orderly sequency of instruction words which are stored in the computer memory.

2. Prior Art

Prior art synchronous computers generally operate on a cyclic basis whereby an instruction is fetched during a fetch portion of a cycle and then executed during an execute portion of the cycle. The instruction fetch is performed by a program control unit (PCU) which also interprets the instruction OP CODE and issues execution or command signals to the computer arithmetic and logic unit (ALU) which responds thereto to execute the specified operation. The PCU usually includes a counter or register, called the program counter, which contains a number of indicative of the address or memory location of the instruction being fetched. The program counter is updated during each cycle so as to indicate or point to the memory address of the next instruction to be fetched. In many cases, the updating is merely an increment by one or step operation where the instructions of a program sequence are in consecutive memory addresses. However, this is not always the case as programs often include call and branch or jump operations in which the program counter or address pointer must be changed by more than one.

In a call operation it is necessary to temporarily leave the main program instruction sequence to enter an entire subsequence (sub-routine) of instructions with a return to the next instruction address of the main program. One more linkage instructions are required in order to enter into and return from the sub-routine instruction sequence. The linkage instructions essentially serve (1) to place any parameters required by the sub-routine in locations where the sub-routine can find them and (2) to make the address of the next main program instruction available to the sub-routine for the return operation.

In branch or jump operations, the choice of the next instruction is dependent upon the occurrence of a particular condition. In general, the determination of the branching choice requires one or more instructions which test for the particular condition.

In the prior art computers of which the inventor is aware, the updating of the program counter or address pointer takes place at the end of each execution portion of a cycle. This results in relatively long cycle times as the next instruction fetch cannot be performed until the current instruction is executed.

BRIEF SUMMARY OF INVENTION

An object of the present invention is to provide novel and improved program control apparatus.

Another object is to provide program control apparatus in which current instruction execution and next instruction fetch are time overlapped in the same instruction cycle.

Still another object is to provide program control apparatus in which execution of a first instruction, addressing of a second instruction, and calculation of a third instruction address are all done in parallel during one instruction cycle.

Yet another object is to provide novel and improved computer apparatus in which the execution of a current instruction can be inhibited.

Briefly, computer apparatus embodying the present invention includes an addressable memory in which a plurality of instructions is stored. An instruction cycle timing means produces a timing signal at the outset of each instruction cycle. During each instruction cycle, first and second sources for the next instruction address are provided. An instruction register is loaded with each instruction when addressed from the memory in response to the timing signal at the outset of each instruction cycle. A decoder responds to each instruction stored in the instruction register to generate a set of execution signals which represent the operation specified thereby. An instruction execution means responds to the execution signal sets to execute the instruction. A further means responds to each instruction stored in the instruction register to selectively couple one of the next address selection sources to the memory during the same time interval that the execution means is executing the same instruction.

In a preferred embodiment, some of the instructions include a test field. The further means includes a condition storage means responsive to the timing signal to store the status of a condition resulting from a first instruction execution which occurred during a first instruction cycle. The further means also includes a first test means responsive to the conditions storage means and to the test field of a second ensuing instruction to selectively couple one of the next address selection sources to the memory. A second test means responds to the condition storage means and to the test field of the second instruction to selectively inhibit or enable the execution of the second instruction.

BRIEF DESCRIPTION OF THE DRAWINGS

In the accompanying drawings, like reference characters denote like structural elements, and.

DESCRIPTION OF PREFERRED EMBODIMENT

General

Program control apparatus embodying the present invention may be employed in any suitable stored program computer which has the capability of performing program jump, branch, call, and the like. However, by way of example and completeness of description, the program control apparatus of the present invention will be presented herein as embodied in a stored program computer having the general architectural arrangement illustrated in FIG. 1. The computer shown in FIG. 1 includes a program control unit (PCU), an arithmetic and logic unit (ALU) 11 and one or more memories designated as the program memory 12, the program/data memory 13 and the data memory 14. The ALU 11 is of the so-called buss type in that it includes several registers (not shown in FIG. 1) which are arranged to have their contents gated onto either of a pair of synchronous busses, the A BUSS and the B BUSS, which busses form the inputs to the adder of the ALU. The A BUSS and the B BUSS are brought out of the ALU 11 so as to be available for the connection of optional functional units 15 thereto. The optional functional units 15 may include, for example, additional registers, a fast shift unit, a high speed multipler, an emulator unit and other suitable units. As shown by the arrows in FIG. 1, the A BUSS is uni-directional from the ALU so as to transfer the contents of any of the ALU registers to an external device or functional unit, whereas the B BUSS is a uni-directional buss which transfers data from a functional device into any of the ALU registers.

Figure 1:
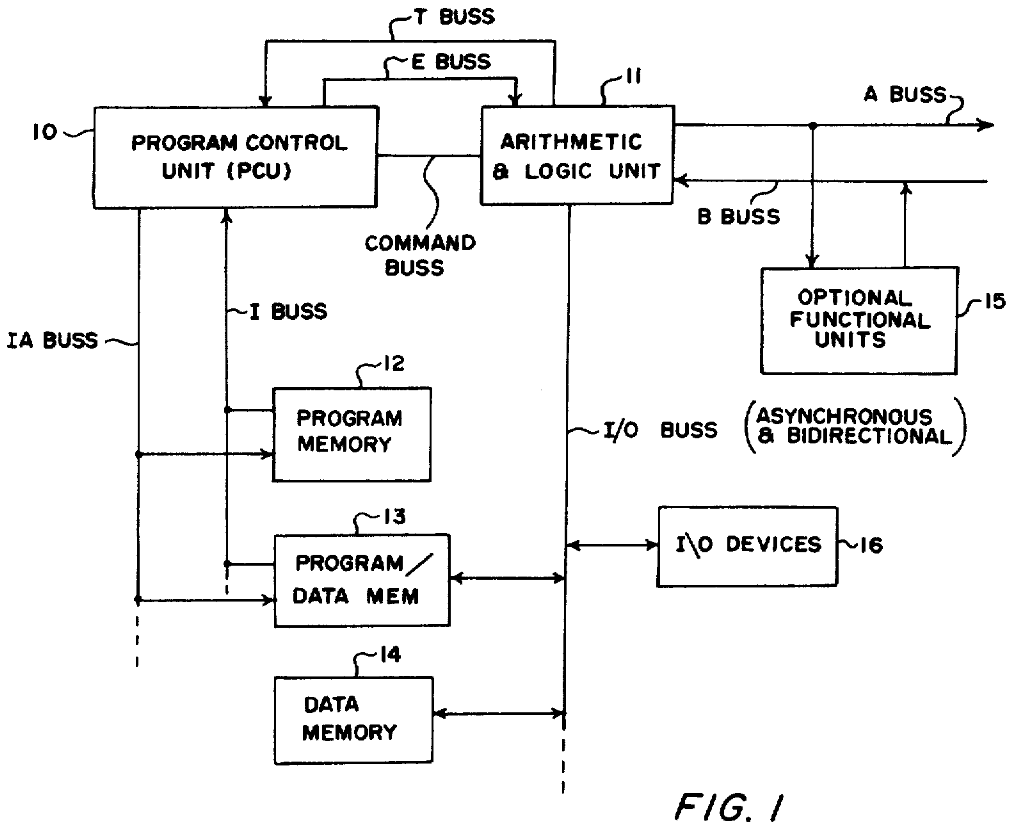
FIG. 1 is a block diagram and signal flow path showing an exemplary computer apparatus in which program control apparatus embodying the present invention may be employed.

Input and output of data to and from the ALU 11 are by way of an asynchronous I/O BUSS which may be bidirectional as indicated in FIG. 1 or may consists of two uni-directional busses, one for inputting data to and one for outputting data from the ALU. Connected to the I/O BUSS are I/O devices 16 (for example, a keyboard, printer, display terminal, card punch or reader, and the like), the program/data memory 13 and the data memory 14. All of the devices 13, 14 and 16 are thus treated as separate addressable devices. For example, if the ALU 11 requires a data operand from the memory 14, the address of the data operand is formed in the ALU and transmitted to the data memory 14 via the I/O BUSS. The data memory 14 responds thereto to send the addressed data operand to the ALU via the I/O BUSS during a subsequent instruction cycle.

The PCU 10 is coupled to the memories 12 and 13 via an instruction address buss, IA BUSS, and an instruction buss, I BUSS. The I/A BUSS is employed to send program instruction addresses from the PCU to the memories 12 and 13; and the I BUSS is employed to translate addressed program instructions from the memories, 12 and 13, to the PCU. Similar to the I/O BUSS, the I BUSS and the IA BUSS are operated in an asynchronous manner. Accordingly, each of these busses includes some handshaking control leads in addition to a lead for each bit in a data quantity or word. For example, the PCU 10 must send out an instruction request handshake signal along with each instruction address. The addressed instruction cannot be received, however, until the addressed memory sends back an instruction response signal.

Asychronous access to the memories 12, 13 and 14 allows the use of a combination of memory speeds and sizes in the computer system so as to improve cost/performance. For example, a small but fast read only memory can be combined with a large but slower read write memory. It should be noted that the program/data memory 13 is a two port memory with one port servicing ALU formed addresses for data operands and the other port servicing PCU formed instruction addresses for program instructions.

The PCU 10 interprets each instruction and issues execution or command signals via a COMMAND BUSS to the ALU 11. The ALU responds to the command signals to perform the instruction specified operation upon the contents of the instruction specified ALU register or registers. Also shown in FIG. 1 are an E BUSS and a T BUSS. The E BUSS is employed by the PCU to save an instruction address by storing it in one of the ALU registers. On the other hand, the T BUSS is employed to select one of the ALU registers as the source of a next instruction address.

INSTRUCTION SET

Figure 2:
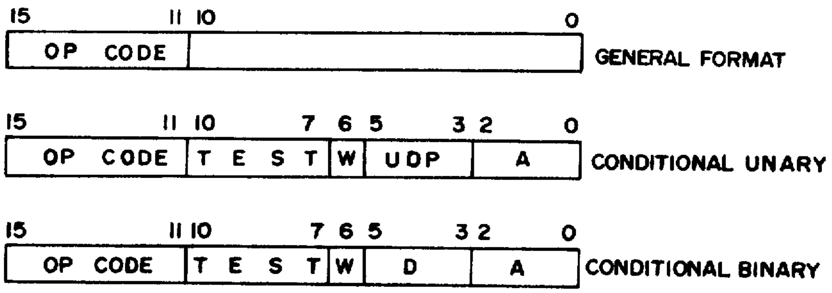
FIG. 2 is a pictorial representation of instruction formats which are employed in FIG. 1 computer apparatus.

A general instruction format is shown in FIG. 2 for an exemplary 16 bit instruction length. Bit positions 11–15 of each of the instructions constitute the operation code (OP-CODE) thereof. In the general format bit positions 0 through 10 are left blank in FIG. 2 since these bit positions may be employed for a number of different purposes, such as ALU register addresses, control of external devices, modification of the contents of addressed ALU registers or of PCU registers and, important to the present invention, test codes which can be employed for logical test operations.

For purposes of illustrating the present invention, two classes of instructions which employ test codes have been shown in FIG. 2. In the conditional binary instruction, the A code in bit position 0–2 represents the register, the contents of which are to be operated on in the manner specified by the OP-CODE. The instruction execution results would then be placed in the register designated by the D field in bit position 3–5. In the conditional unary instruction, the A code represents the register, the contents of which are to be operated upon in the manner specified by the OP-CODE. The instruction execution result however, is to remain in the register designated by the A code. The W bit in position 6 of these two instructions indicates whether the operation is to be performed upon a data word (16 bits for the illustrated example) or a byte (8 bits).

The test field in bit positions 7 through 10 is employed to perform logical test operations upon the results of a previously executed instruction. One of these test operations selects a condition latch, e.g., a link status latch, and tests its output. If true, the current instruction is executed and a true path is selected for the next instruction address. If false, the current instruction is not executed anda false path is taken for the next instruction address selection. It is to be noted that the conditional unary and conditional binary instructions are merely representative of several different types of instruction which may include a test field. For example, the instruction set may also include conditional branch and/or indexing instructions where the execution of branching and indexing operations is dependent upon the results of a logical test. As will become apparent thereinafter, the test code feature is especially useful to control program loop operations.

The instruction set also includes other instructions for forming I/O addresses for the I/O BUSS and for controlling the operation of the functional devices 15 on the synchronous A BUSS and B BUSS. These instructions and others are not described herein since they are not germane to an understanding of the present invention.

OVERLAPPED FETCH, EXECUTE, AND ADDRESS CALCULATION

According to the present invention, the PCU 10 performs the operations of next instruction fetch, including program transfers (jump, branch, call, etc.,) and current instruction execution in parallel. That is, the next instruction fetch and the current instruction execution operations are performed during overlapped time periods rather than in sequential time periods. In addition, execution of a current instruction is conditional upon the results of a previous instruction.

Figure 3:
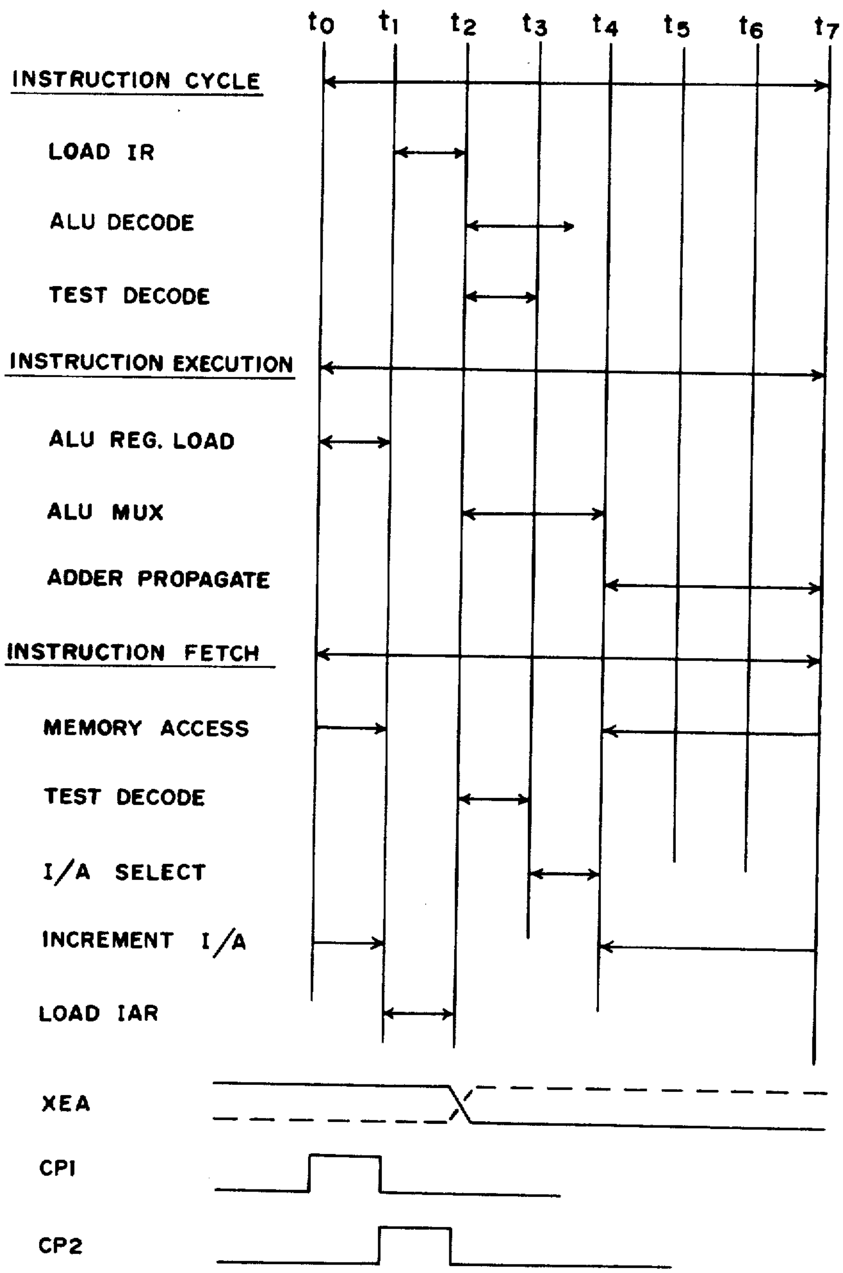
FIG. 3 is a timing diagram illustrating the overlapping of a current instruction execution and the next instruction fetch in one instruction cycle.

The timing diagram of FIG. 3 shows the timing overlap of next instruction fetch and current instruction execution in a single instruction cycle. For convenience, the instruction cycle has been arbitrarily divided into 7 time slots defined by times $t_0$ to $t_7$. The computer timing circuitry generates a pair of clock or strobe signals CPI and CP2 during consecutive time intervals at the beginning of each instruction cycle from $t_0$ to $t_1$ and from $t_1$ to $t_2$. It should be noted that due to the asynchronous nature of the IA BUSS and I BUSS, there may be a waiting period or timelapse between the end of one instruction cycle and the strobe generation for the next cycle.

The first of the two clock pulses CP1 serves to load the ALU registers with the result of the previous instruction execution, which instruction is still in the instruction register (IR) at this time from $t_0$ to $t_1$. It is to be noted that this loading of the ALU register with the result of the previous instruction execution is conditional upon the value of an execute enable (XEA) signal. If the EA signal is a 1, the ALU register will be loaded. On the other hand, if the XEA signal is a 0, the result of the previous instruction execution will not be loaded. That is, the previous instruction execution result will be discharged. The XEA signal value is determined by the logical test which is performed during time $t_2$ to $t_3$ of an instruction cycle. Hence, the value of the XEA signal is determined during one instruction cycle for use during the next succeeding instruction cycle.

The CP2 clock signal is employed during time $t_1$ to $t_2$ to load the instruction register (IR) with the current instruction and to load the instruction address register (IAR) with the value of the current instruction address either incremented by one or modified by some other value. As pointed out above, the test field decode takes place during time $t_2$ to $t_3$. Overlapped with this time interval is the decoding operation for the ALU execution signals and ALU multiplexer (MUX) register select signals. By time $t_4$ these execution signals have obtained a steady state such that the ALU register or registers, as the case may be, is or are loaded and selected and the data signals are available without any additional timing pulses on the A BUSS for propagation through the ALU adder. Thus, adder propagation occurs as shown in FIG. 3 from time $t_4$ through time $t_7$ at the end of the instruction cycle.

At the same time $t_2$ through $t_4$ that the ALU decoding operation is taking place, the next instruction address calculation and source selection is also occurring. The test field of the current instruction is decoded from time $t_2$ to $t_3$ and is employed to select either the IAR or a branch (program transfer) address stored in a ALU register (herein designated as R7). By the time $t_4$ the selection is completed such that the next address is gated on to the IA BUSS. As a result, the next instruction is being accessed during the period $t_4$ through $t_7$ and extending over through the first time slot ($t_0$ through $t_1$) of the next instruction cycle. Overlapped with this accessing of the next memory instruction and execution of the current instruction is the incrementing of the next instruction address by one.

Although for the purpose of illustration, the CP1 clock pulse has been shown to occur in the first time slot of an instruction cycle, it could just as well occur during the last time slot of the instruction cycle. That is, the ALU registers could just as well be loaded with an instruction execution result during the last time slot of an instruction cycle so long as the cycle time is long enough to allow the instruction execution to be completed.

It can thus be seen that the use of the test code allows the overlapping of current instruction execution with next instruction fetch in a single instruction cycle. The manner in which this is achieved will become clear from the detailed description of the PCU and ALU which follows.

DETAILED DESCRIPTION

Figure 4:
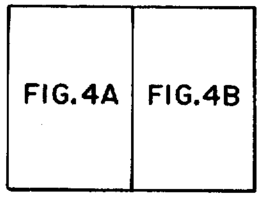
FIG. 4 is a composite showing the arrangement of FIGS. 4A and 4B.
Figure 4A:
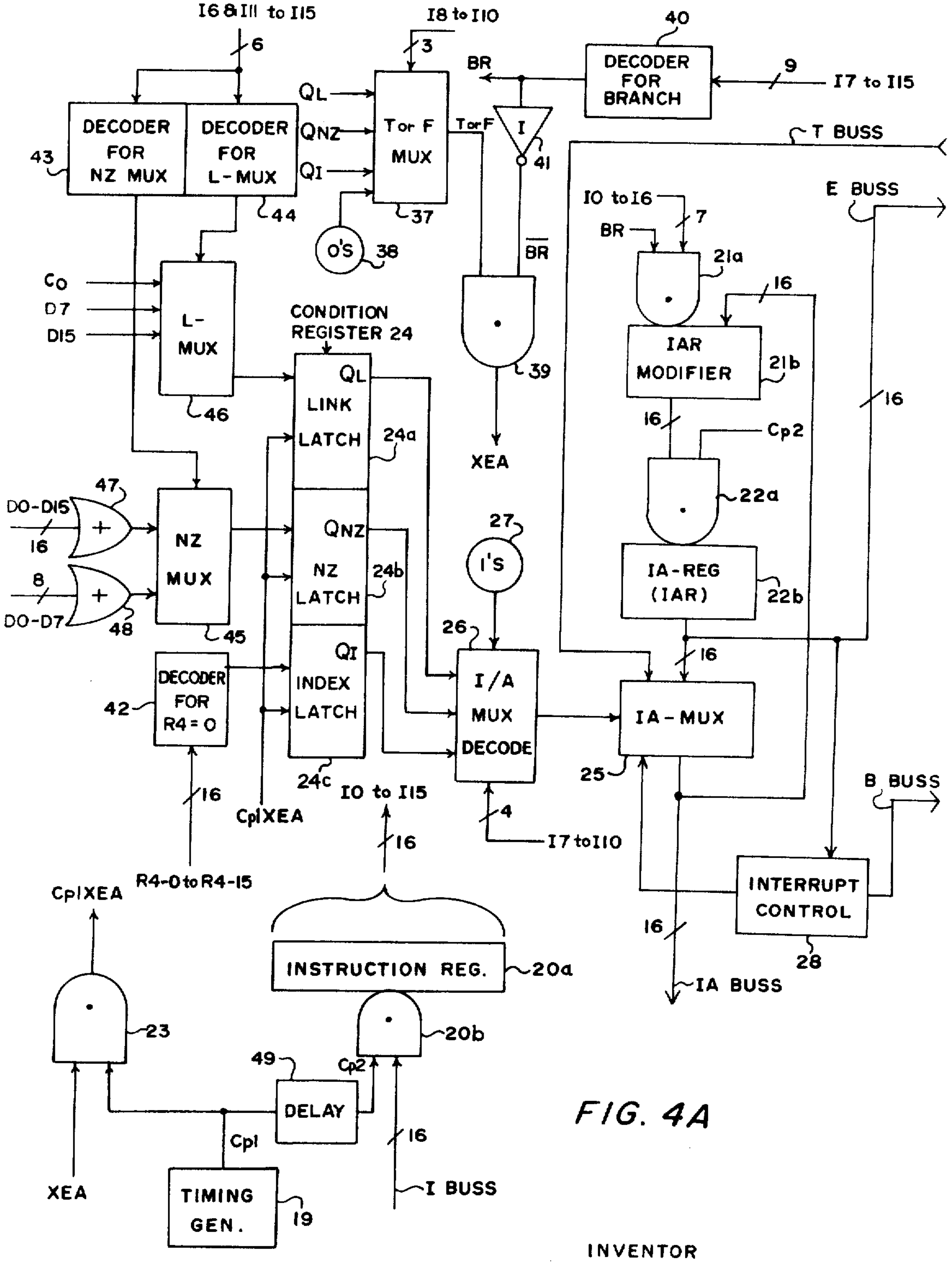
FIGS. 4A and 4B are a block diagram, in part, and a logic schematic, in part, of program control apparatus embodying the present invention.
Figure 4B:
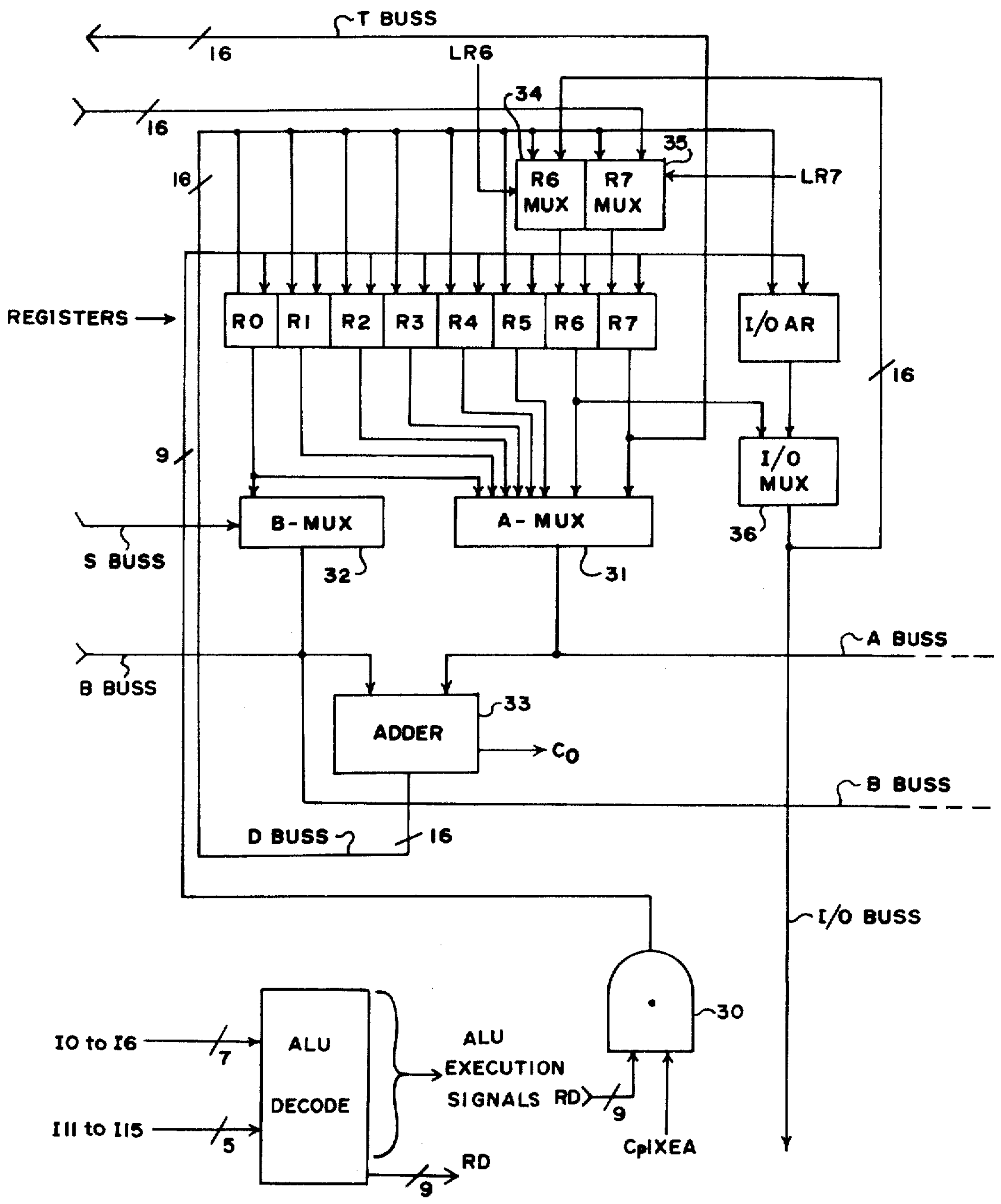

Referring now to FIGS. 4A and 4B which should be arranged according to the composite of FIG. 4, the PCU and ALU are illustrated in more detail with a number of blocks containing known circuits which are actuated by bi-level electrical signals applied thereto. When the signal is at one level (say, the high level), it represents the binary "1," and when it is at another level it represents the binary digit "0." Also, to simplify the discussion, rather than speaking of an electrical signal being applied to a block or logic stage, it is sometimes stated that a "1" or a "0" is applied to the block or stage.

The decoder, multiplexer, register, adder, latch, flip-flop, logic gate blocks shown in the drawing may take on any suitable form. For example, these known circuits may be selected from either or both of the following catalogs: Fairchild TTL Family, October, 1970, a catalog of Fairchild Semiconductor/a division of Fairchild Camera and Instrument Corp.; or MSI/TTL Integrated Circuits from Texas Instruments, bulletin CB-125, a catalog of Texas Instruments, Inc. Also, to aid in the illustration of signal flow, a coincidence gating network is sometimes shown at the input to a register although such networks are normally included in the register blocks themselves in the aforementioned catalogs. Coincidence gates are represented in the drawings with the conventional AND gate symbol having a dot therein and OR gates are represented by the conventional OR gate symbol with a + contained therein. A small circle at the output of these gates represents a signal inversion such that the AND and OR gates become NAND and NOR gates, respectively. When a signal flow path contains more than a single lead or conductor, a slash mark is made through the path together with an adjacent number indicating the number of conductors in the path. Although only single gates are illustrated on the drawings, each such gate is in reality a gating network having a number of gates equal to the number of signal leads in a signal flow path. For example, the gating network **20*b* in FIG. 4A actually includes 16 separate AND gates, one for each of the 16 conductors in the I BUSS with each of the 16** AND gates being clocked or strobed by the CP2 pulse.

One final note before proceeding with the description, the signal leads have in some cases been interrupted and labeled rather than shown as continuous leads so as to avoid cluttering the drawing. In addition, where only part of the leads of a buss or register are employed as inputs to a block, they have been labeled by their source accompanied with bit position. For example, the outputs of instruction register **20*a* are labeled as I0 to I15 to account for the 16** bit positions thereof.

As previusly pointed out, at the start of each instruction cycle the PCU timing generator 19 (shown in detail in FIG. 4) generates a clock or strobe pulse CP1. The CP1 pulse is employed to load a selected ALU register with the results of ain instruction execution. To this end, the CP1 pulse is combined in an AND gate 23 with the XEA signal to produce a signal CP1 XEA. The CP1 XEA signal is employed to strobe the instruction execution result into the ALU register designated by the A or D field of the instruction which is stored in the IR **20*a*** during time *t*0 to *t*1 of an instruction cycle. As pointed out previously, the instruction which has just been executed is stored in the IR at this time.

The CP1 pulse is also employed to generate the CP2 pulse which occurs during the next succeeding time slot $t_1$ to $t_2$. To this end, the CP1 pulse is shown in FIG. 4A to be applied to a delay 49 which delays the CP1 pulse by a 1 clock time or time slot so as to produce the CP2 pulse. It should be apparent that the CP2 pulse could also be produced by the timing generator 19.

The CP2 pulse is employed to load two registers. First, the CP2 pulse strobes gating network **20*b* so as to load into the instruction register (IR) 20*a* the current instruction which is being provided on the I BUSS by one of the memories 12 and 13 (FIG.1). Second, the CP2 pulse strobes gating network 22*a* so as to load into the instruction address register (IAR) 22*b* the address of the current instruction incremented by one. As will become apparent as the description proceeds, the current instruction address was incremented during the previous instruction cycle by an IAR modifier network 21*b* which received the current address instruction from the IA BUSS at that time. The IAR modifier 21*b* may suitably be an adder network which always adds one to the address received from the IA BUSS unless its input gating network 21*a* is enabled. The enabling of gating network 21*a* and modified operation of the IAR modifier 21*b*** will be discussed later on.

when the instruction register **20*a* has been loaded, an ALU decoder 29 decodes the instruction in the IR to provide a set of ALU execution signals to the ALU (FIG. 4B). These ALU execution signals generally control the operation of the ALU and are mostly unnecessary to understanding of the present invention. By way of example, one group of ALU execution signals has been shown in FIGS. 4A and 4B, namely the RD signals. These signals appear on nine leads to select one or more of the ALU registers R0 – R7 or the I/O address register (I/O AR) to be loaded woth the result of the execution of previous instruction from the ALU D BUSS. As pointed out previously, however, this loading of the ALU registers with the result of the previous instruction execution is conditional upon the logical test being performed by the current instruction which generates the execute enable XEA signal. Accordingly, the RD signals are ANDED in a gating network 30 with the CP1 XEA signal. The nine output leads of the gating network 30 are applied as different load enable leads to the registers R0 – R7** and I/OAR.

In addition to the aforementioned registers, the ALU includes A and B multiplexers A-MUX 31 and B-MUX 32, respectively, an adder 33, an R6 MUX 34, an R7 MUX 35 and an I/O MUX 36. The A-MUX is arranged to connect anyone of the ALU registers R0–R7 to the A BUSS under the control of the current instruction A field as decoded by the ALU decoder 29. The B-MUX 32 is arranged to connect either the R0 register (which serves as the ALU accumulator) or the contents of an S-BUSS to the B BUSS under control of the instruction OP CODE and W bit (16). The S-BUSS is employed for performing left circular shift by a number of bits determined by the interconnections with the A BUSS. For example, for a left circular eight shift, the eight least significant bits of the A BUSS are connected to the eight most significant bits of the S BUSS and the eight most significant bits of the A BUSS are connected to the eight least significant bits of the S BUSS.

The adder 33 receives inputs from the A-BUSS and the B-BUSS and performs either an addition or a logical operation or neither (in the case of a mere transfer of data) thereon in accordance with the OP CODE as decoded by the ALU decoder 29. The application of the ALU execution signals to the various blocks in FIG. 4B has been omitted in order to avoid clutter of the drawings. The output of the adder 33 is the D-BUSS which is arranged for gating into one or more of the ALU registers R0–R7 and I/O AR at the beginning of each instruction cycle. The adder carry out $C_o$ is employed as an input to the link latch **24*a*.**

Figure 5:
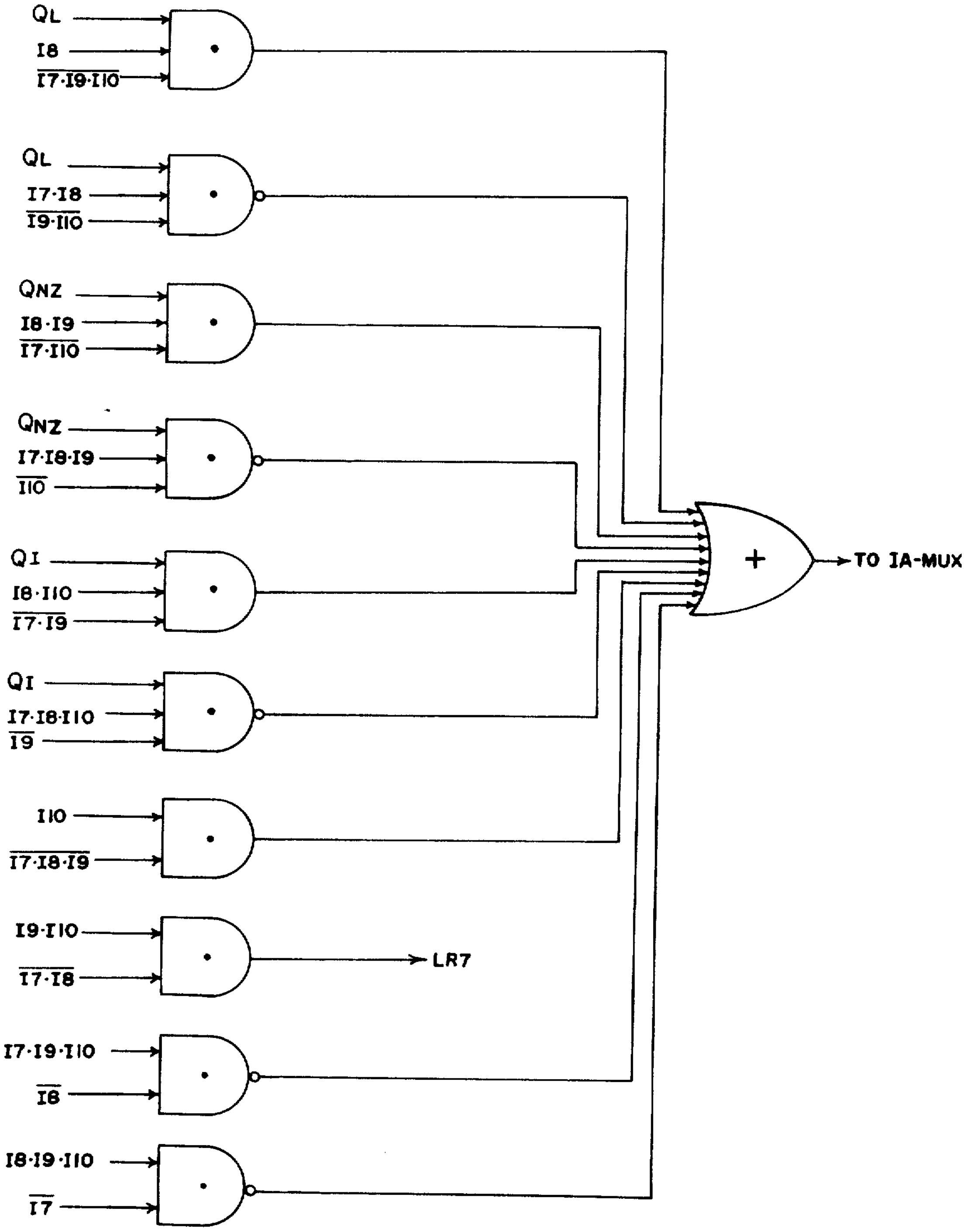
FIG. 5 is a logic schematic of a typical decoder network which may be employed in the program control apparatus of FIG. 4A.

The R6 MUX 34 provides a means by which register R6 may be loaded from either the D-BUSS or from the I/O BUSS. To this end, a load register R6 (LR6) signal is shown to be applied to the R6-MUX 34. The LR 6 signal can be derived from an I/O instruction (not illustrated herein) in a manner similar to the derivation of the LR 7 signal as shown in FIG. 5.

In addition to being employed as the input register for the computer, the R6 register is also employed as an output register to the I/O BUSS. To this end, the I/O MUX 36 is arranged to connect either the register R6 or the register I/O AR to the I/O BUSS. The I/O AR register is employed to form the address of an I/O device (e.g., an operand address in either the memory 13 or the memory 14 FIG. 1).

The R7 MUX 35 allows the R7 register to be loaded either from the D BUSS or the E BUSS which contains the output of the IAR of FIG. 4A. To this end, the R7

MUX is controlled by the LR7 signal to load the D BUSS into R7 when it is a 0 and to load the E BUSS into R7 when it is a 1.

With the type ALU architecture shown in FIG. 4B, it can be easily seen that the data operands will propagate through the A-MUX, B-MUX and adder 33 as soon as the current instruction is decoded by the ALU decoer 29 (FIG. 4B). As shown in FIG. 3, the ALU propagation is seen to occur in the period from $t_4$ to $t_7$. As can be seen in FIG. 3, this period overlaps the selection and the addressing of the next instruction address by the PCU 10.

The next address selection as well as the generation of the execute enable XEA and the $C_p$ XEA signals is a function of the logical test called for by the current instruction. The logical test which generates the XEA signal is performed by means of a true or false multiplexer (T or F MUX) 37 under the control of the three most significant bits, I8 to I10, of the test code of the current instruction. The inputs to the MUX 37 are the condition latch outputs $Q_L$, $Q_{NZ}$ and $Q_I$ and an unconditional (for unconditional program transfers) input represented by the all 0's source 38. It should be noted that the all 0's source 38 may suitably be a connection to circuit ground in systems where the 0 signal level is 0 volt. The output of T or F MUX 37 will then follow its selected input so as to be either true (enabling) or false (inhibiting). As pointed out previously, if the XEA signal is forced false during the current instruction cycle by the logical test, the CP1XEA signal will not be generated during the next succeeding instruction cycle. What this does essentially is to inhibit the execution of the current instruction by now allowing its results to be loaded into the ALU register at the outset of the next succeeding instruction cycle.

This T or F MUX output may suitably form the XEA signal in some systems. However, it is shown to be further processed by an AND gate 39 so as to allow for those situations where it might be desirable to inhibit the generation of the XEA signal. For example, it may be desirable to inhibit the XEA signal in response to certain types of instructions contained within the instruction set. By way of example, the generation of the inhibit signal has been shown in FIG. 4A for a branching instruction which has been previously alluded to, but not shown. A typical relative branch instruction format could include an OP CODE and a TEST CODE and a further number in bit positions I0 through I6 signifying the amount by which the current instruction must be modified so as to point to the next instruction to be addressed. Essentially, the branch instruction is detected by a decoder 40 in response to bits I7 to I15 of the current instruction. Decoder 40 upon detection of a branch instruction issues a branch (BR) signal which is inverted by an inverter 41 to provide the complement $\overline{BR}$ which is employed as an inhibit signal to the XEA AND gate 39. Thus, the $\overline{BR}$ signal will be true when the current instruction is not a branch instruction so as to enable the AND gate 39. On the other hand, when a branch instruction does occur, the $\overline{BR}$ signal is false so as to inhibit AND gate 39 from generating a true XEA signal.

To complete the example of a branch instruction, the BR signal is also shown to control an enabling gating network 21A at the input of the IAR modifier 21B. As previously pointed out, the IAR modifier 21B normally receives the current address instruction from the IA BUSS and increments it by one. In the case of a branch instruction, the gating network 21A would be enabled to pass the bits I0 to I6 of the branch instruction to the sixth most significant bit positions of the IAR modifier 21B. The output of the IAR modifier 21B would then represent the address of the instruction called for by the branch instruction. It should be noted that the foregoing discussion of the branch instruction is by way of example only and that other types of instructions may also inhibit the generation of the XEA signal.

As point out previously, the next address source selection is also a function of logical test called for by a current instruction. The IA MUX decoder 26 responds to the current instruction test code to select either one of the condition latches 24*a* to 24*c* in the case of a conditional program transfer or a permanent source of 1's 27 in the case of an unconditional program transfer. The output of the decoder 26 is supplied to an instruction address multiplexer (IA-MUX) 25 so as to select the next instruction address in accordance with the true and false test. An exemplary group of test code bit patterns for the typical program transfers is shown in the test field chart below for selection of the condition latches and the permanent source of 1's.

TEST FIELD CHART

| I10 I9 I8 I7 | Condition | True Path | False Path |
|---|---|---|---|
| 0010 | Link | Step | Jump |
| 0011 | Link | Jump | Step |
| 0110 | Not Zero | Step | Jump |
| 0111 | Not Zero | Jump | Step |
| 1000 | Unconditional | Step | — |
| 1010 | Index Not Zero | Step | Jump |
| 1011 | Index Not Zero | Jump | Step |
| 1100 | Unconditional | Save | — |
| 1101 | Unconditional | Jump | — |
| 1110 | Unconditional | Call | — |

Only true paths are employed for the unconditional program transfer operations of step, save, jump and call. On the other hand the bit patterns which select the conditional latches 24*a*, the LINK latch, 24*b*, the NOT ZERO (NZ) latch, or 24*c*, the INDEX latch, may be either jump or call transfers depending upon whether the selected latch output is true or false. For instance the test code 0010 selects a program step if the output of the link latch is true and a program jump if the link latch output is false.

The IA MUX decoder 26 may assume any suitable form as specified by the test field chart. An exemplary logic schematic is given in FIG. 5. As there shown, the test code of bit patterns are combined in coincidence gates with the condition latch outputs for conditional program transfers. For the case of unconditional transfers, coincidence gates are provided to merely test for the presence of the bit pattern, the source of 1's being omitted. That is, the permanent source of 1's is represented in FIG. 5 by the absence of a third input to the two input coincidence gates.

If the output of a selected coincidence gate is a 1, the program transfer is a step operation which will result in the selection of the IAR as the source of next instruction address. On the other hand, if the output of a selected conicidence gate is a 0, the program transfer is a jump, call, or save in which case register R7 will be selected as the source of the instruction address. To this end, all the outputs of the coincidence gates in FIG. 5 are ORRED together so as to provide a single control line to the IA-MUX 25 (FIG. 4A). Also shown in FIG. 5 is a separate AND gate for detecting the unconditional save test code and generating a load register R7 (LR 7) signal.

As previously pointed out, the condition latches **24*a*, 24*b* and 24*c* are conditioned by the results of the execution of a current instruction but are loaded in response to the CP1XEA signal of the next succeeding instruction cycle. The index latch 24*b* is employed to signify that an indexing operation is taking place. For an indexing operation, one of the ALU registers designated herein as R4 is loaded with an index value indicative of the number of times program loop is to be executed. Upon the completion of each loop execution, the index value is decremented. When the index value is all 0's, the iterative operation of the program loop is completed. This all 0's condition is detected by a decoder 42 which provides a 1 or true input to latch 24*c*** in response thereto.

The NZ (not zero) latch **24*b* is employed to signify that the result of the previous instruction execution is not equal to zero. To this end, an OR network 47 is provided to OR all of the leads of the D BUSS B0 to B15 for the case of a word operation. The output of the OR network 47 will be a 0 only when the D BUSS contains all 0's. Another OR network 48 is provided to OR the eight least significant bits D0 through D7 of the D BUSS for the case of a byte operation. The single lead outputs of the OR gates 47 and 48 are applied to an NZ-MUX 45. The NZ-MUX 45 serves to connect the output of either the OR network 47 or the network 48 to the data input of the NZ latch 24*b* under the control of the current instruction bits I6 and I11 to I15 as decoded in a decoder 43**.

The link latch 24a is employed to store any one of a number of conditions arising from the execution of a previous instruction as selected by the current instruction word bits I6 and I11 to I15. For example, the link latch can be employed to store the carry status of the adder 33 or the shifted out bit of either a full word or a byte shift. To this end, the carry out $C_0$ and the D7, and D15 leads of the D BUSS are applied to the L MUX 46. The current instruction word bits I6 and I11 to I15 are decoded by a decoder 44 so as to control the L MUX 46 to select one of the $C_0$, D7 or D15 inputs for application to the data input of the link latch **24*a***.

As mentioned previously the instruction address multiplexer (IA-MUX) 25 responds to the output of the I/A MUX decoder 26 to connect to the IA BUSS the address of the next instruction which is supplied from either one of two sources. These two sources are the IAR 26b or register R7 of the ALU. To this end, the IA-MUX 25 receiees the contents of the IAR as well as the contents of register R7 via the T BUSS. The IAR is selected for program step operations and register R7 is selected for program jump, call and similar operations under the control of the output of an IA-MUX decoder 26.

For the case where the stored program computer is to have an interrupt unit, the IA-MUX 25 can be controlled to ignore the signal from the IA-MUX decoder 26. When this is done, the IA-MUX 25 will in lieu of selecting R7 or the IAR, gate all 0's on the IA BUSS. The all 0's address would then be indicative of address of the interrupt control routine. To effect the foregoing operation, an interrupt control unit 28 of any suitable type is shown to have a control lead connected to the IA-MUX and to receive as an input the contents of the IAR for the purpose of saving the current instruction address incremented by one while an interrupt is being processed. In addition, the interrupt control unit 28 is shown to be connected to the synchronous B BUSS.

The above described computer apparatus embodying the present invention performs current instruction execution and next instruction addressing in parallel rather than sequentially as in prior art computers. By time $t_3$ of the instruction cycle, the IR, IAR, ALU registers and condition registers have been loaded and the source selection of the next instruction address has taken place. During the remainder of the instruction cycle the current instruction is executed, the next instruction address is applied to the IA BUSS and the next instruction address is modified in the IAR modifier 21B. The logical test fields included in the instructions allows the programmer to not only provide for the program transfers but also to essentially inhibit execution of a current instruction by not allowing its execution results to be stored or saved during the next instruction cycle.

The test code feature which allows overlap of program transfer and current instruction execution is especially useful in the control of program loops. In the prior art, program loops generally included one or more set up instructions for entering a loop, one or more loop instructions for executing an operation, a test instruction for testing normal depletion of the loop iterations, and a branch instruction for either returning to the loop instructions if the loop depletion test is false or for branching to the next instruction if the loop depletion test is true.

For example, in a table look up operation it might be desired to find a value in a table stored in memory which is equal to a known value. Like the prior art, the set up instructions would serve to load the unknown value into a register (R4) and a number equal to the number of values in the table into a register (R6) having counting properties. The next set up instruction would then load a base address equal to the address of one of the end values, say the smallest address, into another register R5. The next set-up instruction would then load another register R7 with the starting address of the instruction loop. The loop instructions would then include a first instruction which causes the value pointed to by the contents of register R5 to be loaded into another register R3. The next loop instruction is a compare operation which compares the contents of R4 (the known value) and R3 (the table value) for equality. The next loop instruction tests the equality result and, if true (found value), branches to the next instruction after the table look up operation. If the test is false, the program steps to the next loop instruction.

In the prior art, the loop instructions would at this point include separate instructions for (1) decrementing the count value in R6, (2) testing the count value (3) incrementing the base address in R5 and (4) branching according to the count test results. The use of the test fields in the present invention allows either the latter three or all four of these instructions to be replaced by a single instruction.

Considering first the replacement of the count value testing, base address incrementing and branching instructions, a conditional unary instruction is employed having an OP CODE specifying that the contents of R5 (base address) be incremented and a NOT ZERO test code of 0111 for testing the NOT ZERO latch (see the test field chart). The state of the NZ latch is a function of the just executed decrement R6 instruction. If the NZ latch state is true (R 0), then the current condition unary instruction is executed and the true path, a jump to the address pointed to by the contents of register R7, is selected. On the other hand, if the NZ latch state is false (R6=0), then the XEA signai is turned off such that the results of the current instruction execution will not be stored during the next instruction cycle. Also, the false path is chosen such that the source of the next instruction address is the IAR. If the true path is taken, the loop instructions are then again executed; and if an inequality if found, the conditional unary instruction is again employed to control the continuation of the loop or to branch upon normal depletion of the operand in the table.

By changing the value of the test code in the conditional unary instruction, all of the prior art loop control instructions (increment base address, decrement count, test count and branch) can be replaced by a single instruction. For this example, the test code would be interrupted as follows. If the contents of R6 are not zero, then XEA is allowed to be true so that the instruction will be executed incrementing R5 and decrementing R6. The program then jumps to the address pointed to by the contents of register R7. On the other hand, if the contents of R6 are equal to zero, the false path should be taken whereby the program source for the next instruction address is the instruction address register. It should be noted that for this example, additional connections would have to be made in the diagram of FIGS. 4A and 4B. These connections would involve applying the output of the IA MUX decode 26 as a count enable input to the R6 counter type register.

Figure 6:
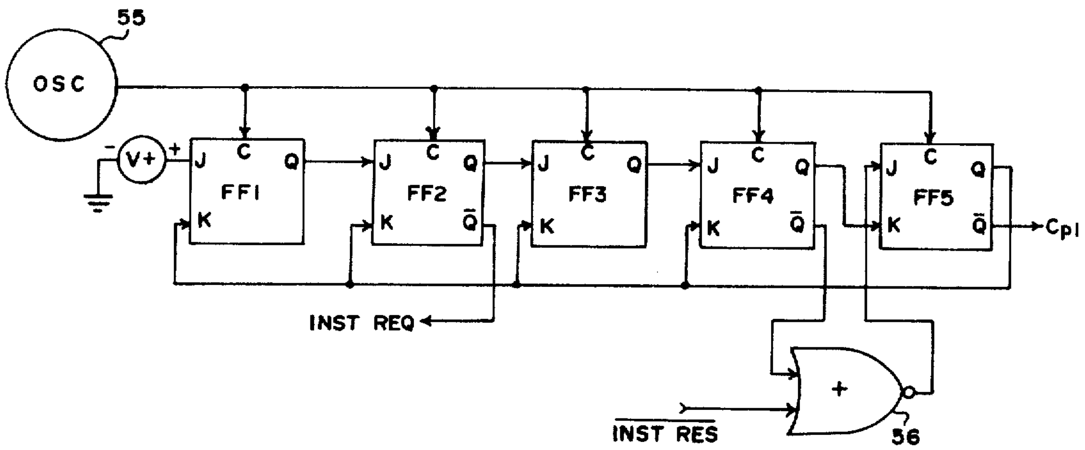
FIG. 6 is a logic schematic showing an exemplary timing generator which may be employed in program control apparatus embodying the present invention.

There is shown in FIG. 6 an exemplary timing generator which may be employed in apparatus embodying the present invention. The timing generator includes an oscillator 55 arranged to drive the clock inputs of a plurality of JK flip flop stages which form a pulse division network. The J terminal of the first stage flip flop FF1 is connected to a source of 1's. The K terminals of the first four stages are coupled to the Q output of the last stage FF5. The Q outputs of the first, second and third stages are coupled to the J inputs of the second, third and fourth stages, respectively. The fourth stage FF4 is coupled to the K input of the last stage FF5. Also the $\overline{Q}$ output of the fourth stage FF4 is coupled by way of a NOR gate 56 to the J input at the last stage FF5. The $C_p$ strobe signal is then taken from the $\overline{Q}$ output of the last stage FF5.

With the interstage couplings as shown in FIG. 6 and discussed above, the pulse division network will contain on consecutuve clock pulses (so long as the NOR gate 56 is enabled) the bit patterns shown in the timing generator pattern chart below.

TIMING GENERATOR PATTERN CHART

| FF1 | FF2 | FF3 | FF4 | FF5 |
|---|---|---|---|---|
| 0 | 0 | 0 | 0 | 0 |
| 1 | 0 | 0 | 0 | 0 |
| 1 | 1 | 0 | 0 | 0 |
| 1 | 1 | 1 | 0 | 0 |
| 1 | 1 | 1 | 1 | 0 |
| 1 | 1 | 1 | 1 | 1 |
| 0 | 0 | 0 | 0 | 0 |

As can be seen from the chart, the last stage FF5 toggles or changes its state in response to every sixth oscillator pulse so long as the NOR gate 56 remains enabled. The purpose of the NOR gate 56 is to provide asynchronous operation for handshaking or control purposes on the IA BUSS and the I BUSS. Accordingly, as the bit pattern proceeds from the all zero state to the condition where the FF2 stage assumes a 1 state, the $\overline{Q}$ output FF2 will become a zero so as to provide an instruction request (INST. REQ) signal of value 1 which is coupled via the IA BUSS (FIG. 1) to the addressed memory 12 or 13 as the case may be. This INST REQ signal will remain a 1 until the all 0 state of the pulse division network is again achieved at the end of the $C_p$ strobe signal.

The purpose of the NOR gate 56 is to inhibit the pulse division network from responding to any further clock pulses after the 1110 state is attained until the addressed memory transmits an instruction response (INST RES) signal signifying that an instruction has been read onto the I BUSS. The complement of this signal $\overline{\text{INST RES}}$ is employed as an inhibit input to the NOR gate 56. So long as the $\overline{\text{INST RES}}$ signal is true or a 1, signifying no instruction on the I BUSS, the output of the NOR gate 56 will be 0 such that FF5 cannot change from its O state. When the $\overline{\text{INST RES}}$ signal does become a 0, signifying an instruction on the I BUSS, the output of NOR gate 56 will become a 1 such that FF5 will toggle on the next ensuing oscillator pulse.

There has thus been described program control, apparatus in which current instruction execution and next instruction fetch are accomplished in parallel during each instruction cycle. It should be apparent that the logic diagrams shown throughout the drawings are illustrative of one embodiment and that other designs may be employed. In addition, it is to be noted that the illustrated conditional move and conditional binary instruction and the aforementioned branch instruction are merely representative of the types of instructions which may employ a test code. The instruction set may additionally include instructions which have no test code. Instructions of this type may be intepreted so as to select the IAR for a program step type operation. To accomplish this, the IA-MUX decode network 26 would further include logic circuitry to detect the absence of a test code.

What is claimed is:

1. Computer apparatus comprising an addressable memory for storing a plurality of instructions some of which include a test field;

instruction cycle timing means for producing a plurality of instruction cycles;

first and second address sources;

execution means responsive to said timing means for executing a first instruction during each cycle;

memory addressing means responsive to said timing means, to the test field of said first instruction and to the status of a condition resulting from an instruction execution during previous cycle to selectively transmit the contents of one of said address sources to the memory to read therefrom a second instruction;

calculation means responsive to said timing means for calculating the memory address of a third instruction during each cycle concurrently with the execution and addressing of the first and second instructions respectfully; and loading means for loading the calculated address of said third instruction in the first source during each cycle after its contents have been transmitted to said memory.

2. Computer apparatus as set forth in claim 1 wherein said memory addressing means includes a condition storage means for storing said status of a condition resulting from an instruction execution during a previous cycle; and first test means responsive to the condition storage means and to the test field of the first instruction to selectively transmit the contents of one of said address sources to the memory.

3. Computer apparatus as set forth in claim 1 wherein said memory addressing means further includes second test means responsive to the condition storage means and to the test field of the first instruction to selectively inhibit the execution of the first instruction.

4. Computer apparatus as set forth in claim 3 wherein the second test means produces a bivalued execute enable signal;

wherein said instruction execution means includes a plurality of registers, means responsive to the first instruction to generate a set of execution signals during each instruction cycle, an adder and logic network responsive to the execution signal for performing the operation called for by the first instruction upon the contents of selected ones of said registers to produce a set of execution result signals, selected ones of the execution result signals being coupled to said condition storage means; and wherein gating means responds to one value of the execute enable signal and to the instruction cycle timing means during the next succeeding instruction cycle to load said execution result signals into a selected one of said registers and to the other value of the execute enable signal to inhibit the loading thereof.

* * * * *

PO-1050
(5/69)

UNITED STATES PATENT OFFICE
CERTIFICATE OF CORRECTION

Patent No. 3,766,527 Dated October 16, 1973

Inventor(s) Joseph C. Briley

It is certified that error appears in the above-identified patent and that said Letters Patent are hereby corrected as shown below:

| | |
|---|---|
| Column 5 line 50 | change "EA" to --XEA--. |
| Column 7 line 32 | change "ain" to --an--. |
| Column 10 line 61 | change "conicidence" to --coincidence--. |
| Column 11 line 51 | change "receiees" to --receives--. |
| Column 13 line 1 | change "(R 0)" to -(R6≠0)-- |
| Column 13 line 5 | change "signai" to --signal--. |
| Column 13 line 51 | change "consecutuve" to --consecutive--. |

Signed and sealed this 2nd day of July 1974.

(SEAL)
Attest:

EDWARD M. FLETCHER, JR.
Attesting Officer

C.MARSHALL DANN
Commissioner of Patents